United States Patent [19]

Sanderson et al.

[11] 4,051,264

[45] Sept. 27, 1977

[54] COLD WATER EXTRACTABLE TEA LEAF AND PROCESS

[75] Inventors: Gary Warner Sanderson, Englewood; Andrew Charles Hoefler, Cresskill; Harold Nathaniel Graham, Englewood, all of N.J.; Philip Coggon, Orangeburg, N.Y.

[73] Assignee: Thomas J. Lipton, Inc., Englewood Cliffs, N.J.

[21] Appl. No.: 742,281

[22] Filed: Nov. 16, 1976

Related U.S. Application Data

[63] Continuation of Ser. No. 610,647, Sept. 5, 1975, abandoned, which is a continuation-in-part of Ser. No. 559,232, March 17, 1975, abandoned.

[51] Int. Cl.$^2$ ............................................... A23F 3/00
[52] U.S. Cl. ........................................ 426/52; 426/597
[58] Field of Search ........................... 426/52, 597, 49

[56] References Cited

U.S. PATENT DOCUMENTS

| 2,785,979 | 3/1957 | Mitchell | 426/597 |
| 2,975,057 | 3/1961 | Seltzer | 426/597 |
| 3,438,785 | 4/1969 | Zamgitat et al. | 426/597 |
| 3,812,266 | 5/1974 | Sanderson et al. | 426/597 |

FOREIGN PATENT DOCUMENTS

| 1,380,135 | 1/1975 | United Kingdom | 426/597 |

OTHER PUBLICATIONS

Chem. Abstracts, 114216m, vol. 79/1973.
Chem. Abstracts, 132218j, vol. 81/1974.

*Primary Examiner*—Steven L. Weinstein
*Attorney, Agent, or Firm*—Brumbaugh, Graves, Donohue & Raymond

[57] ABSTRACT

Cold water extractable tea leaf is prepared by treatment of fresh green tea with the enzyme tannase under anaerobic conditions. The cold water extractable tea leaf is also used to prepare an instant tea product.

16 Claims, No Drawings

COLD WATER EXTRACTABLE TEA LEAF AND PROCESS

This a continuation of application Ser. No. 610,647 filed Sept. 5, 1975, now abandoned, which is a continuation-in-part of application Ser. No. 559,232, filed Mar. 17, 1975, now abandoned.

BACKGROUND OF THE INVENTION

The present invention relates to a process for obtaining cold water extractable tea leaf and to the improved products thereby obtained. In particular, the invention relates to a method of treating fresh green tea leaf with the enzyme tannase to produce dry tea leaf, green, black or oolong, which is cold water extractable, and which has a full complement of the tea flavor associated with the corresponding prior art processes.

Black tea is usually prepared by subjecting freshly picked tea leaves to a series of processing conditions including the withering and rolling of freshly harvested leaves, followed by a fermentation step (enzymatic oxidation) during which much of the characteristic color, flavor and aroma of black tea are developed. The fermentation is stopped after a suitable period of time by "firing" (drying at temperatures ranging from about 65° C to about 100° C) the tea to inactivate the enzymes causing the fermentation and to complete the development of the flavor and color of the tea product. The extent of fermentation varies, in commercial practice, from black to various gradations between green and black. Partially fermented teas are known as "oolong" teas. Green teas are made by firing green tea before fermentation has taken place. The green, oolong, and black teas of commerce each provide a beverage having distinctive flavor and color characteristics.

When conventional teas are extracted with cold water for short periods of time (less than 15 minutes), the tea beverage produced has a low concentration of extractable tea solids, a very light color and almost no tea-like taste. Water at temperatures of about 100° C is usually employed to obtain a satisfactory beverage with prior art tea leaves.

Various procedures are known to the art for making cold water soluble instant tea powders by solubilizing tea cream obtained from black tea extracts, e.g., Herz, U.S. Pat. No. 2,831,772; Perech, U.S. pat. No. 2,863,775; and Barch, U.S. Pat. No. 3,136,539. While each of these processes are successful to varying degrees in producing a cold water soluble instant tea powder, each has disadvantages. Most fail to provide a tea powder which, on reconstitution, gives a beverage having a natural flavor and color. Furthermore, none of these prior art processes provide a tea powder which will provide the "milk reaction" provided by natural tea. Naturally brewed tea, when milk is added, takes on a bright pinkish-reddish color which is pleasing to the eye. The instant tea powders produced by the prior art techniques described above, when reconstituted as a hot beverage, react badly to the addition of milk, taking on a dull unpleasant coloration.

One method utilizing tannase enzymes to produce cold water soluble instant tea powder is the subject of a copending application of Graham, Ser. No. 173,323, filed Aug. 19, 1971, now abandoned. It is also known from the Sanderson et al. U.S. Pat. No. b 3,812,266, that fresh green tea homogenate, when given a pre-conversion tannase treatment, will yield an instant tea powder which is cold water soluble.

SUMMARY OF THE INVENTION

It has now been found that tea leaf products which are capable of producing a high quality tea beverage upon brewing with either cold or hot water, and which have a substantially reduced level of cold water insoluble solids are obtained by contacting comminuted fresh green tea with tannase under essentially anerobic conditions and thereafter firing the leaf. In the case of oolong and black tea, the process of the invention includes the steps of converting the fresh green tea after tannase treatment to oolong or black tea by the traditional methods of fermentation, using the natural tea enzymes, followed by firing.

The resulting products are tea leaf products which have a full measure of the organoleptic properties of prior art tea leaf products, but which also give a high yield of tea solids upon extraction with cold or hot water. The products of the invention have the unique property of producing high quality tea beverages when brewed with cold water, whereas conventional tea leaf products are only poorly extracted by cold water, and for this reason, prior art tea leaf products require boiling water to prepare a full-flavored beverage.

Further, the black tea beverages produced by either cold water or hot water extraction of the black tea leaves produced by our new process have the excellent flavor of good quality commercial black teas, a highly acceptable bright red color, good clarity when cold and a "milk-reaction" characteristic of conventionally brewed tea. The tea leaves produced by this new process, therefore, have the unique property of providing a high quality tea beverage when brewed with cold water, whereas all other black tea leaf products are only poorly extracted by cold water.

Moreover, the cold water extractable tea leaves of the invention can be used to produce an instant tea product by the simple process of extracting the tea leaves with boiling water, clarifying the extract, and drying it. The instant tea produced by this method gives a higher yield of cold water soluble tea solids than instant tea produced by the usual method of extracting regular black tea, solubilizing the tea cream clarifying the tea cream and drying it. Furthermore, the instant tea product of the invention has a high quality black tea flavor.

DETAILED DESCRIPTION OF THE INVENTION

The term "fresh green tea," as used herein an in the appended claims, includes freshly gathered tea flush; namely, the entire shoot tips of the tea plant, *Camellia sinesis*, (L) O. Kuntze, including both stems and attached leaves. The term "fresh green tea" includes any tea plant material containing the naturally occurring enyzmes in an active form in the tissues of the freshly gathered tea. The term "fresh green tea flush" includes freshly harvested tea flush, withered tea flush, and freshly harvested tea flush that has been frozen to preserve the enzyme systems therein. In each instance, the fresh green tea described above has undergone substantially no fermentation to the black tea state.

In accordance with a preferred embodiment of the invention, fresh green tea flush is comminuted to ensure that a major portion of the soluble tea flush constituents are brought into contact with one another to form a green tea system capable of undergoing conversion to black tea. Comminution may be carried out in any convenient manner which will not destroy the activity of the tea enzymes, the latter being required for the subsequent step of converting the green tea to black. Suitable comminution techniques include passing fresh green tea through closely spaced rollers or forcing fresh green tea through a meat grinding machine. The full benefit from the comminution process is realized when it is carried out in such a way as to minimize the amount of aeration of the tea leaf prior to tannase treatement. This is desirable to as to minimize the amount of tea fermentation, which is an aerobic process, from taking place until the pre-conversion tannase treatment described below has been initiated.

In one preferred embodiment, potassium hydroxide is added as a 7% aqueous solution, in the amount of 9 mg KOH per gram dry weight of tea material, and is mixed by rolling the tea. It has been noted that the process of the present invention brings about a slight reduction in the pH of the resulting tea beverage. While it is not a necessary step, it may be desirable to add sufficient alkali to restore the pH of the tea to its normal level. This pH adjustment step may be accomplished either before or after the tannase treatment step.

The comminuted fresh green tea is next given a pre-conversion tannase treatment by contacting it with a tannase enzyme preparation. THe tannase enzyme is preferably added to the comminuted green tea is the amount of about 8 enzyme units, as measured by the modified Iibuchi et al. method described in Example 1, infra, per gram dry weight of green tea tissue. Mixing is ensured by further rolling of the green tea. It is preferred that the comminuted green tea flush now be maintained under essentially anaerobic conditions in contact with the tannase for about 15 minutes to 1 hour at 25° C, so as to enable the tannase treatment to take place before an appreciable amount of tea fermentation has taken place. Maintenance of essentially anaerobic conditions may be accomplished by placing the comminuted tea flush in a closed vessel and sparging the system with nitrogen gas to displace the air present in the vessel, or, more simply, by keeping the comminuted leaf in a large mass such that the surface area exposed to air is minimized. Following these procedures will maximize the cold water extractability of the products. Indeed, most of the cold water extractability is obtained without the requirement of an anaerobic condition during the pre-fermentation tannase treatment, as long as the tannase is added to the comminuted fresh tea flush prior to tea fermentation. Virtually all the benefit is lost if the tannase is added after the tea fermentation is complete.

The anerobic pre-conversion tannase treatment step may be conducted using a range of enzyme concentrations, temperatures, and treatment times. An enzyme level ranging from 2 to 20 or more tannase units per gram dry weight of green tea, as measured by the Iibuchi et al. method, infra, may be used. A level as low as 2 units per gram of total green tea solids may be used, but the yield and quality of the product is less than optimum. A level of tannase above 8 enzyme units may be used, but no substantial additional benefit is obtained.

The temperature at which the pre-conversion tannase treatment is carried out may be varied over a wide range. Favorable yields are obtained at temperatures ranging from 25° C to 55° C. At the higher limits of the range, that is, at 55° C, a less desirable conversion of green tea solids to black is obtained. This result is probably due to inactivation of the natural tea enzymes at these higher temperatures.

The range of time during which the pre-conversion tannase treatment is conducted under anaerobic conditions has some bearing on the yield of cold water extractable tea solids and the lightness of the color obtained. Unless the comminuted tea leaf is contacted with the tannase under anaerobic conditions for a few minutes, a less than optimum product, which gives a light colored beverage, is obtained. Additional treatment, say up to about 15 minutes, provides improved results. Favorable cold water extractability and color characteristics are obtained after a 15-minute preconversion tannase treatment under anaerobic conditions. Additional times up to 120 minutes or more have been used but without substantially improving the yield or color of the product.

Following completion of the pre-conversion tannase treatment, the tea conversion process is effected by adjusting the temperature of the comminuted green tea to about 32° C, and contacting the green tea with air at high relative humidity. A satisfactory conversion is generally effected in about 90 minutes. The fermented tea flush is fired by placing it in a forced air oven at about 80° C for about 30 minutes to reduce the moisture content of the tea material to below about 5%. Firing of the fermented tea leaf is important for the full development of black tea flavor.

The enzyme tannase which is used in accordance with the present invention is known to hydrolyze the ester linkages as well as the depside linkages of tannic acid between gallic acid and glucose. It also attacks gallic acid methyl ester. One source of the enzyme is an elaboration product of the growth of certain molds belonging to the genus *Aspergillas* or *Penicillium*. For example, *Aspergillus flavus* grown on a medium containing tannic acid as a sole carbon source provides tannase in substantial amounts. Two specific strains of microorganisms known to produce substantial quantities of tannase are *Aspergillus oryzae*, ATTC No. 9362 and *Aspergillus niger*, ATCC No. 16888. One suitable preparation of tannase enzyme is available commercially from the Enzyme Development Corporation. This preparation is obtained with a strain of *Aspergillus oryzae*.

Tha tannase of the present invention is available commercially as a powder, and it is supplied at varying levels of activity, depending upon its source and the method of recovery used. The commercial preparation described above, has about 20,000 enzyme units per gram of powder, as determined by the modified Iibuchi et al. method described in Example 1 below.

While the exact mechanism by which the invention works is not known, it is believed that the processes described above cause the tannase enzymes to enter the tissues of the green tea thereby causing the hydrolysis of the ester bonds which link gallic acid and tea catechins to provide a higher yield of cold water extractable tea solids. It appears that this effect is achieved because there is a release of juices when the green tea leaf materials are squeezed during the rolling process. When the squeezing pressure is released, these juices are reabsorbed causing the tannase enzyme that was added to the green tea leaf material to be absorbed into the tea leaf tissues. The enzyme then proceeds to de-esterify the tea catechins. After this pre-conversion tannase treatment is completed, the normal tea manufacturing process, for either green, oolong or black tea, may be carried out.

The process of the present invention may also be caarried out with the enzyme preparations fixed onto solid supports such as glass or polymeric materials to allow removal from the system and reuse of enzymes. Enzyme preparations of this nature are termed "immobilized" or "insolubilized" in the art. Techniques for accomplishing the fixation of enzymes on insoluble matrices are disclosed in the U.S. Pat. Nos. 3,519,538, 3,536,587, and 3,556,945. Additional discussion of these techniques may be found in O.R. Zaborsky, C.R.C. Handbook of Immobilized Enzymes, 1973, the Chemical Rubber Co., Cleveland, Ohio. In general, enzyme insolubilization processes require the fixation of the enzyme to an insoluble matrix by covalent bonding, by absorption, or by occlusion. The fixed enzyme preparations may be recovered for reuse and provide a method for completely removing the enzyme from the tea materials undergoing treatment. In addition, the insolubilized enzymes are conveniently provided in particulate form which, in turn, may be packed into columns for use in continuous processes.

The process using immobilized enzymes makes use of an aqueous extract of green tea leaf prepared at less than 50° C to retain enzymes in their active form. The extract is given pre-conversion tannase treatment by contacting the extract solids with immobilized tannase fixed on a suitable support, such as by passing the tea extract through a column packed with the enzyme fixed on glass particles. The tea conversion process is then effected by contacting the tannase treated extract with the green tea flush residue, drying them together, and firing the tea to form a cold water extractable black tea leaf product.

The cold water extractable tea leaf can also be used to prepare a superior instant tea product by the simple procedure of extracting the tea leaf, clarifying the extract and thereafter drying it. By contrast, instant tea is usually produced by extracting regular black tea, solubilizing the tea cream, clarifying the tea cream and then drying it. By using the cold water extractable tea leaf of the invention, a higher yield of instant tea solids is obtained because the tannase treatment is applied before any "permanent" insolubilization of the tea leaf solids has occurred as the result of the more orthodox black tea manufacturing process. For example, as noted above, the usual method of producing an instant tea starts with the extraction of regular black tea. In the manufacture of regular black tea, fermentation and firing result in the formation of polyphenolic oxidation products which are "permanently" insolubilized by attachment to the insoluble matter of the tea leaf material. This results in the loss of some of the extractable tea solids.

By contrasts, the pre-fermentation tannase treatment of the present invention results in the formation of polyphenolic oxidation products that are less prone to become "permanently" insolubilized by attachment to the insoluble tea leaf materials. This means that a higher economic yield of cold water soluble instant tea solids is obtained by starting with the tea leaf of the present invention rather than with regular black tea. Moreover, because the tea leaf of the present invention is fired at the end of the enzymic conversion process, the instant tea product has a high quality black tea flavor.

The invention will be further described with reference to the following examples.

EXAMPLE I

The method used for the determination of tannase activity of enzyme preparations is a modification of the method described by Sadaaki Iibuchi, Yasuji Minoda, and Koichi Yamade in Agricultural and Biological Chemistry, Vol. 31, p. 513 (1967). This method determines the amount of tannic acid which is hydrolyzed in the presence of a measured amount of the tannase enzyme under a specified set of conditions by measuring the decrease in absorbancy of the substrate at a wavelength of 310 nm using a recording ultraviolet spectrophotometer. The solution used for this assay is a 0.004% tannic acid solution in 0.02M acetate buffer (pH 5.0). The tannic acid used is Analytical Reagent Grade Tannic Acid, Catalog No. 1764, Mallinckrodt Chemical Works, St. Louis, Missouri. 3.0 ml of this solution is placed in a 1 cm cuvet which is held at 30° C in the temperature controlled sample chamber of a Cary Model 14 recording ultraviolet spectrophotometer; the device is sold by Cary Instruments, Monrovia, California. Finally, 0.1 ml of enzyme solution is added and the absorbance change at a wavelength of 310 mm is followed continuously. The concentration of the enzyme solution is adjusted until an absorbance change of about 0.01 absorbance units/minute is observed. One unit of tannase enzyme activity measured by this method is defined as that activity which will give a change of 1 absorbance unit per minute at 310 nm (30° C, 1 cm cell) using a 0.004% tannic acid solution in 0.2M acetate buffer (pH 5.0) with a starting absorbance of about 0.7.

Three tannic acid supplies were tested in this assay: Namely, (a) Tannic acid N.F. - Catalog No. 1750 and (b) Tannic acid Analytical Reagent - Catalog No. 1764 from Mallinckrodt chemical Works, St. Louis, Missouri; and (c) Tannic acid N.F. - Catalog No. 1198, Allied Chemical Corporation, Morristown, New Jersey. All three samples of tannic acid give the same results when used in the assay described above. The commercial tannase enzyme obtained from the Enzyme Development Corporation, New York, N.Y., was found by this method to have about 20,000 units of activity per gram.

Data herein which describes the color and haze of tea beverage products are given in terms of results obtained by conducting standard tests using a Hunter D-25 colorimeter made by Hunter Research Associates of Fairfax, Virginia. The haze values are determined by reflectance, and the figures given indicate the amount of reflected light. The lower the haze number, the clearer the tea solution. The tri-stimulus color determination is based on measurements of transmitted light. The L value is the lightness factor: A value of 100 indicates no color, whereas a value of 0 indicates absolute darkness. The $a$ value is a measure of the red-blue range of colors, and the $b$ value is a measure of the green-yellow line. When tea solutions are analyzed at beverage strength, i.e., 0.35% tea solids, in a 5 cm cell, the preferred L value is in the range of 20 to 35, the preferred $a$ value, is at least 5 units greater than the L value, and the preferred $b$ value is between 15 and 25.

EXAMPLE II

Fresh green tea was obtained from a tea farm near Charleston, South Carolina, and was used fresh, or was stored frozen at −40° C for use at a later date.

PRODUCT A

A 300 g sample of fresh green tea having a total solids content of about 25%, was withered for 18 hours at 25° C to 35% solids, and was then sliced in a noodle slicer (model "Regina", manufactured by Giunta Brothers, Philadelphia, Penna.) such that the leaf present was sliced into strips about 2 mm wide. The withered, sliced green tea was passed between a pair of rollers set with a spacing of 0.63 mm. This rolling operation was repeated four times in succession to fully comminute the green tea. The comminuted green tea was mixed with 0.7 g of potassium hydroxide in 10 mls of water for 2 minutes in a Hobart eccentric paddle mixer (model N-50, Hobart Manufacturing Company, Troy, Ohio). Next, the green tea material was passed twice through the rollers to ensure even distribution of potassium hydroxide throughout the green tea mass. The green tea material was again placed in the Hobart mixer, 600 units of tannase enzyme dissolved in 10 ml of water was added, and mixed The preparation was mixed for 2 minutes. After mixing, the green tea material was again put through the rollers twice. The comminuted green tea material containing tannase enzyme was then held under essentially anaerobic conditions in a covered beaker for 30 minutes at 25° C. After the holding period, the green tea material was spread on a tray so as to allow air passage to all green tea particles, and it was allowed to ferment for 90 minutes at 32° C and at a relative humidity higher than 90%. Following this, the converted tea flush material was fired by passing air at 80°-85° C through it for 30 minutes reducing its moisture content to less than 5%. The black tea produced by this process was then sieved, and the fines; namely, the material passing through as US Standard 40 mesh screen, which was only about 2% of the black tea produced, were discarded. The finished black tea product (Product A) was then placed in an aluminum foil lined paper pouch to age to 90 days.

PRODUCT B

The procedure used in preparing Product A was repeated on an additional 300 g of fresh green tea using the same conditions except that the potassium hydroxide and tannase additions, and the anerobic holding period were omitted. This procedure is essentially the standard process for black tea manufacture.

PRODUCT C

This is a blend of teas, whose origin would include India, Sri Lanka, and East Africa, which may be found commercially available black tea products, i.e., loose tea or tea bags.

Both Products A and B were judged to be sound black tea products in that the hot tea beverages made from Products A, B and C were found to be similar in terms of extracted solids, color, and taste.

Extraction yield studies for Products A, B, and C were carried out over a range of extraction temperatures. For each measurement, 2.25 g of leaf was placed in a beaker with 200 ml of deionized water at the desired temperature. After stirring for 3 minutes with an overhead stirrer operating at ~ 250 RPM, the spent leaf was separated from the extract by passing the extract through one layer of Miracloth, and the solids in the beverage was determined by taking the extract to dryness and weighing the residue. The results of this study (summarized in Table 1) show clearly that Product A (tannase treated) had a good cold water extractability while Product B (not tannase treated) was poorly extractable with cold water. Finally, Product C (commercial tea; no tannase treatment) had the poorest cold water extractibility of the three products tested. The extraction yield at 30° C for Product A almost equals that of B and C at near boiling extraction conditions of 95° C.

TABLE 1.

EFFECT OF TEMPERATURE ON EXTRACTON YIELD OF 3 BLACK TEAS

| Extraction Temperature | Product A Extraction Yield (%) | Product A Taste, Color | Product B Extraction Yield (%) | Product B Taste, Color | Product C Extraction Yield (%) | Product C Taste, Color |
|---|---|---|---|---|---|---|
| 10° C | 20.7 | Tea-like but weak, light red-brown | 14.8 | Slightly tea-like, light brown | 3.7 | Tasteless, very light brown |
| 20° C | 24.8 | Tea-like, slightly weak, red-brown | 18.4 | Slightly tea-like, light brown | 7.3 | Tasteless, light yellow |
| 30° C | 29.8 | Balanced, tea-like, red-brown | 21.0 | Slightly tea-like, light red-brown | 14.4 | Slightly tea-like, astringent, yellow |
| 50° C | 31.8 | Strong, tea-like, red-brown | 23.4 | Tea-like, weak, red-brown | 22.8 | Tea-like, but weak light red-brown |
| 95° C | 35.4 | Strong, tea-like, red-brown | 32.7 | Full bodied, balanced, tea-like, red-brown | 32.0 | Full bodied, balanced, tea-like red-brown |

EXAMPLE III

The procedure used in prearing Product A was repeated on 5 additional 300 g batches of fresh green tea using the same conditions except that tannase was used in the amount of 0, 2, 4, 8, and 16 umits per g dry weight of green tea to give Products D, E, F, G, and H respectively. The cold water extractability of these products using 20° C water was determined in the manner described in Example II. For further evaluation, beverage strength extracts were prepared by placing 2.25 g of leaf in 200 ml of distilled water at 20° C, stirring for 3 minutes with an overhead stirrer at 250 rpm, and filtering the slurry through a medium sintered - glass funnel. The color of the beverage was then determined in terms of $L$, $a$, $b$, and haze values.

The results of these tests are summarized in Table 2 and show that a satisfactory product can be made using 4 to 16 units of tannase activity per gram of green tea. Products F, G, and H have increased extraction yield and greatly improved color.

TABLE 2.

EFFECT OF TANNASE LEVEL ON COLOR, CLARITY, AND EXTRACTION YIELD OF 5 BLACK TEAS

| Product | Tannase Level (units/g dry weight) | Extraction Yield 20° C (%) | L | a | b | Haze |
|---|---|---|---|---|---|---|
| D | 0 | 18.7 | 53.9 | 28.0 | 36.3 | 8 |
| E | 2 | 22.8 | 34.3 | 32.9 | 23.8 | 13 |
| F | 4 | 23.2 | 27.6 | 32.2 | 19.3 | 13 |

TABLE 2.-continued
EFFECT OF TANNASE LEVEL ON COLOR, CLARITY, AND EXTRACTION YIELD OF 5 BLACK TEAS

| Product | Tannase Level (units/g dry weight) | Extraction Yield 20° C (%) | L | a | b | Haze |
|---|---|---|---|---|---|---|
| G | 8 | 23.5 | 22.0 | 29.8 | 15.5 | 14 |
| H | 16 | 23.5 | 22.5 | 30.1 | 15.7 | 14 |

EXAMPLE IV

The Procedure used in preparing Product A, as described in Example II, was used in preparing Products I, J, K, and L, where the only change in procedure was the amount of potassium hydroxide added to the comminuted green tea. Potassium hydroxide in the amount of 0, 0.35, 1.05, and 1.40 g was dissolved in 10 ml of water and was used to prepare Products I, J, K, and L respectively. The cold water extraction yield at 20° C was determined for all 4 products as described in Example II. The pH of each product was determined by extracting 2 g f the leaf with 50 ml boiling deionized water, and allowing it to cool to room temperature (23° C). All of the Products were organoleptically evaluated as beverages. The taste of the resultant beverages varied somewhat between the different samples, but they were quite acceptable in every case. The results, given in Table 3, indicate that the extractable solids remain almost the same even though the pH of the resulting beverages is affected by the amount of KOH used in the process.

TABLE 3.
EFFECT OF AMOUNT OF POTASSIUM HYDROXIDE ON EXTRACTON YIELD OF BLACK TEA

| Product | KOH Added (g) | pH | Extraction Yield (%) |
|---|---|---|---|
| I | 0 | 4.30 | 22.8 |
| J | 0.35 | 4.55 | 24.6 |
| A | 0.7 | 4.80 | 24.8 |
| K | 1.05 | 5.05 | 24.0 |
| L | 1.40 | 5.40 | 25.5 |

EXAMPLE V

The procedure used in the preparation of Product A was repeated with three further batches of leaf. The only change made to the procedure was the temperature used for the tannase treatment. Temperatures 35°, 45°, and 55° C were used in the preparation of products M, N and O, respectively. Extraction yields were determined at 20° C as described in Example II for the three products. The results are given in Table 4 and they indicate that the optimum tannase treatment was achieved in the temperature range 25° to 35° C, while partial success was obtained at 45° C.

TABLE 4.
EFFECT OF TEMPERATURE OF TANNASE TREATMENT UPON EXTRACTION YIELD

| Product | Temperature (° C) | Extraction Yield at 20° C (%) |
|---|---|---|
| A | 25 | 24.8 |
| M | 35 | 22.4 |
| N | 45 | 21.4 |
| O | 55 | 16.0 |

EXAMPLE VI

The procedure used in the preparation of Product A was repeated on a further 300 g batch of tea leaf except that after comminuting the green leaf, tannase was added with no addition of KOH, and then after the 30 minute anaerobic hold period, 0.7g KOH in 10 ml water was added. This procedure is essentially the same as used in the preparation of Product A except that the KOH addition step and the tannase treatment period have been reversed in order. The product made by this modified process was identical to Product A in extractability and beverage color and clarity.

EXAMPLE VII 190 gms of fresh green tea flush was frozen to −20° F, mixed with solid $CO_2$, and cryogenically milled in a hammer mill such that all particles passed a 0.035 inch herringbone sieve. The milled flush was then dispersed in 600 mls of distilled water, and the slurry was brought to 22° C. Tannase enzyme was added in the proportion of 10 units per gram of tea (dry weight basis), and the slurry was stirred for one hour. At the end of the one hour period, the pH of the slurry was adjusted to 5.6 with 10% KOH in water solution, and the slurry was aerated with continuous stirring for 90 minutes. After fermentation, the slurry was then placed in a rotary evaporator, and water was removed under 27 inches Hg vacuum, while the slurry was held at 40° C. When the slurry was dry enough, such that it began to tumble inside the rotary evaporator, the vacuum was dropped back to 19 inches Hg, and the temperature of the leaf slurry was allowed to rise to 95° C over a period of 20 minutes, and held at 95° C for 10 minutes. The vacuum was broken three times, to allow leaf which had become stuck to the sides of the flask to be scraped off and to allow manual mixing of the contents. After 10 minutes at 95° C, the leaf was dry enough such that it could be removed and spread thinly on an enamel tray. The tray was heated to 70° C, and the leaf dried to 3% moisture. The leaf was sieved, and all material passing a U.S. standard 40 mesh screen was discarded.

The black tea leaf produced, Product P, as cold water (20° C) extractable and gave a tea beverage with good color, taste, and clarity. The iced tea beverage produced by cold water extraction of Product P was judged to be far superior to a beverage produced by an instant tea made by the homogenate process without the benefit of a firing treatment. This instant tea was made in the same way as Product P except that, instead of drying the slurry after conversion, an instant tea was prepared directly from the homogenate as described in U.S. Pat. No. 3,812,266. This instant tea was made, therefore, without the firing step normally associated with the manufacture of black tea leaf by drying the hot water extractable tea solids separate from the remainder of the tea flush material. Firing of fermented tea flush is known to play an important role in the formation of black tea flavor and it may well be that firing of the whole fermented tea flush accounts for the good black tea flavor of the cold water extractable black tea produced by this new green tea homogenate conversion process.

EXAMPLE VIII

The procedure used in the preparation of Product P, Example VII, was repeated except that immobilized tannase was used in place of soluble tannase. This required separating the slurry into extract and leaf residue prior to tannase treatment. This was carried out following a 30 minute hold period at 50° C to increase extracted solids content of the water fraction. The clear extract was then passed over a column of tannase immobilized on glass beads until no further pH change was detected. The tannase treated extract was added back to the leaf residue, which still had active tea enzymes, to reform the homogenate slurry. The remaining procedures adopted in the preparation of Product P were followed to produce a tea leaf, Product Q, which was almost indistinguishable from Product P.

EXAMPLE IX 280 grams of fresh tea leaf was placed in an eccentric paddle Hobart mixer and macerated for 4½ minutes. The leaf was transferred to a Waring Blender along with 500 milliliters distilled water, and was further macerated for 3¼ minutes. The resultant slurry was sparged with nitrogen gas for 2 minutes to remove all dissolved oxygen. Tannase enzyme was added to the slurry in the proportion of 10 units per gram dry weight of leaf, and the slurry was stirred for one hour. The pH was adjusted to 5.6 with 7% KOH solution and aeration was then carried out with continuous stirring, for 90 minutes. The slurry was then placed in a Buchi rotary evaporator, and processed in the same manner as described in Example VII for Product P. The black tea leaf prepared, Product R, was judged to be very similar to Products P and Q, having good cold water extractability and giving a beverage with good color, clarity, and taste.

EXAMPLE X

The procedure described in Example II for the preparation of Product A was repeated except that the fermentation period was shortened to 5 minutes under ambient conditions. This resulted in a tea, Product S, with oolong-like character. As a control, the process for preparing Product B was repeated with the same shortening of the fermentation step. The control, Product T, and Product S were extracted with 20° C water as described in Example II. Product S (tannase treated) had an extraction yield of 19.4% while Product T gave a yield of 13.9%. Further, Product S had fuller flavor than Product T, and it was characterized as a very acceptable oolong tea.

EXAMPLE XI

The procedure used in the preparation of Product A was repeated with three further batches of green tea. The only change in the procedure for the first two batches was the length of the pre-fermentation anaerobic hold period; anaerobic hold times of 15 and 0 minutes were used for the preparation of Products U and V, respectively. Product W was prepared to demonstrate the effect of a post-fermentation tannase treatment on the cold water extractability of the finished black tea product. The following procedure was used to produce Product W. A 300 g batch of green tea was withered, comminuted, and 0.7 g of potassium hydroxide in 10 ml. of water was added as described for Product A in Example II. No tannase was added and no anaerobic hold period was used. The comminuted green tea was fermented under the conditions used in the preparation of Product A. After fermentation, 8 units of tannase enzyme per gram dry weight of fermented tea leaf material were added, and the tea flush was passed 2 times through rollers with 0.62 mm spacing to ensure thorough mixing of enzyme and fermented tea leaf material. The tannase treatment was allowed to continue for 30 minutes under anaerobic conditions after which the fermented, tannase-treated, tea flush was dried by the same method as used for Product A.

Extraction yields for Products U, V, and W were determined at 20° C as described in Example II. The results obtained (Table 5) indicate that a pre-fermentation tannase treatment is required in order to obtain the desired cold water extractability and that an anaerobic hold period of about 15 to 30 minutes is required to maximize the cold water extractability of the finished black tea leaf product.

Table 5.

| Product | Point of Addition | Tannase Anaerobic Hold Period (min.) | Extraction Yield At 20° C (%) |
|---|---|---|---|
| A | Pre-fermentation | 30 | 24.8 |
| U | Pre-fermentation | 15 | 24.2 |
| V | Pre-fermentation | 0 | 22.9 |
| W | Post-fermentation | 30 | 13.0 |

Effective Point of Addition of Tannase on Extraction Yield at 20° C of 4 Black Teas

EXAMPLE XII 300 gms of fresh green tea leaf were placed in a microwave oven (Litton model 403.000, Litton Industries, Minneapolis, Minnesota) for 2 minutes, during which time the leaf was heated sufficiently to inactivate the leaf enzymes before any fermentation could take place. The leaf was then passed twice through a Hobart meat grinder, whose front plate had holes 3 mm in diameter. Half of the comminuted leaf was then treated with tannase (at a level of 8 units per gram dry weight), dissolved in 10 ml of water and passed once again through the meat grinder. The tannase treated portion and the untreated portion were then held at 25° C for 30 minutes. Both batches were then fired at 85° C until the moisture content was below 5%. The green tea without the tannase treatment was Product X, and the tannase treated green tea was Product Y.

Extraction yields for the Products X and Y were determined at 20° C as described in Example II. Product X (no tannase) had an extraction yield of 15.5% while Product Y (tannase treated) had an extraction yield of 20.2%. Product Y had fuller flavor than Product X when both were brewed up at 20° C as described in Example III, and Product Y was found to produce a good quality iced green tea beverage.

EXAMPLE XIII

A pilot scale method for preparing cold water extractable black tea was used in this example. Fresh green tea flush was withered overnight to a moisture content of about 70%. An 8 pound batch of the leaf material was comminuted by passing it three times through rollers set at a gap of 0.014 – 0.020 inches. The comminuted tea flush was placed in a Model VL 401 Hobart mixer, and tannase, in the proportion of 8 enzyme units per gram dry weight of tea flush, was added as a water solution and mixed thoroughly. To insure complete mixing, the tea was passed once through the rollers. The mixture was held at ambient temperatures for 30 minutes under essentially anaerobic conditions. The leaf was again placed in the Hobart mixer and potassium hydroxide, in the proportions of 0.9 parts by weight of potassium hydroxide per 100 parts of the dry tea flush, was added as an aqueous solution. After one additional rolling, the tea flush was passed once through an Osborn 4 inch CTC machine (Davidson, Calcutta, India) and fermented for 2.75 hours. The flush was then fired at 180° F and the dry black tea was sieved through a 10 mesh screen.

An instant tea was prepared from this cold water extractable black tea by extracting twice with ten volumes of boiling water. The combined extracts were concentrated to about 6% solids, and 1% calcium choride dihydrate (on a solids basis) was added. The extract was then cooled to 50° F and clarified by centrifuging for ten minutes at 6800 × g and thereafter freeze-dried.

When reconstituted as a beverage, the instant tea, Product $Z_1$, had excellent clarity and the color of freshly brewed black tea. The instant tea product dissolved rapidly in either hot or cold water, and it had a most satisfying black tea flavor when served either as hot or as iced tea.

A control black tea was prepared from the same withered tea flush. A 4 pound batch of this withered tea flush was passed three times through the rollers and once through the Osborn CTC machine. The comminuted leaf was fermented at 80° F for 3.25 hours, and then it was fired at 180° F and sieved through a 10 mesh screen.

An instant tea was prepared from this black tea by extracting it twice with ten parts boiling water. The extract was treated for 30 minutes withh tannase enzyme added in the proportion of 20 minutes per gram of tea solids. (This is equivalent to 7 units per gram of starting tea leaf). After the tannase treatment, the pH was adjusted to 5.0 with 2N potassium hydroxide. The extract was concentrated to about 6% solids, and 1% calcium chloride dihydrate (on a solids basis) was added. After clarification by centrifuging for 10 minutes at 50° F and 6800 × g, the extract was freeze dried. The instant tea, Product $Z_2$, when reconstituted, also gave a good quality tea beverage that had a satisfactory black tea clarity, color, and flavor when used as either a hot or iced tea product.

A comparison of the extraction yield, polishing loss, and process yield for these two black tea products (Table 6) shows that the cold water extractable black tea leaf process gives a fired black tea which yields more tea solids (Product $Z_1$) upon extraction with hot water than the control, or regular, fired black tea. The lower polishing loss also adds to the process yield which is significantly higher for the process used to prepare Product $Z_1$.

TABLE 6

| Instant Teas made from Black Tea using Tannase | | | | |
|---|---|---|---|---|
| Tea Sample | Tannase Treatment | Extraction Yield (%) | Polishing Loss (%) | Process Yield (%) |
| Product $Z_1$ | Prior to fermentation | 37.3 | 7.5 | 34.0 |
| Product $Z_2$ | After extraction | 31.7 | 14.4 | 27.4 |

It will be understood that the embodiments described above are merely exemplary and that persons skilled in the art may make many variations and modifications. Such variations are intended to be within the scope of the invention as defined by the appended claims.

We claim:

1. A process for preparing black tea leaf from green tea leaf which comprises the steps of comminuting freshly harvested green tea leaf, treating the comminuted fresh green tea leaf with tannase at a temperature and for a time sufficient to impart a substantial cold water extractability to the manufactured tea leaf, fermenting the treated green tea leaf, and firing the fermented tea leaf to reduce the moisture content of the tea leaf to below about 5% and produce a cold water extractable fired black tea leaf.

2. In a process for preparing manufactured green tea leaf, the improvement comprising the steps of bringing comminuted green tea leaf into contact with tannase under essentially anaerobic conditions at a temperature and for a time sufficient to impart a substantial cold water extractability to the manufactured tea leaf, and thereafter firing the tea leaf to reduce the moisture content of the tea leaf to below about 5%.

3. A process for preparing manufactured green tea leaf which comprises the steps of heating freshly harvested green tea leaf at a temperature and for a time sufficient to inactivate tea leaf enzymes before fermentation has taken place, comminuting the tea leaf, treating the comminuted tea leaf with tannase at a temperature and for a time sufficient to impart a substantial cold water extractability to the manufactured tea leaf, and firing the treated tea leaf to reduce the moisture content of the tea leaf to below about 5%.

4. A process for preparing black tea leaf from freshly harvested green tea leaf comprising the steps of preparing fresh green tea leaf for fermentation by comminution techniques, adding tannase to the comminuted tea leaf at a level of from about 2 to about 20 units per gram of tea leaf, while maintaining the temperature of the tea leaf within the range of about 25° C to about 45° C and maintaining essentially anaerobic conditions, maintaining the tea leaf in contact with tannase to provide a substantial increase in cold water extractable solids, fermenting the tannase contacted tea leaf under aerobic conditions, and firing the fermented tea leaf to reduce the moisture content of the tea leaf to below about 5% and produce a cold water extractable fired black tea leaf.

5. The process of claim 4, wherein said anaerobic conditions are maintained up to 30 minutes.

6. The process of claim 4, wherein the tannase is added at a level of 8 enzyme units per gram of dry green tea leaf.

7. The process of claim 4, wherein potassium hydroxide is added to the comminuted green tea leaf prior to the step of tannase treatment to provide a pH within the range of about 4.5 to 7.5.

8. The process of claim 4, wherein sufficient alkali is added after the tannase treatment to adjust the pH to that of the original comminuted tea leaf.

9. A process for preparing black tea leaf from freshly harvested green tea leaf which comprises the steps of commimuting freshly harvested green tea leaf, adding the comminuted tea leaf to water to form a tea slurry, treating the tea slurry with tannase under essentially anaerobic conditions at a temperature and for a time sufficient to impart a substantial cold water extractability to the manufactured tea leaf, fermenting the treated tea slurry, and drying the fermented tea slurry with a firing step at the terminus of the drying process, to reduce the moisture content of the tea leaf to below about 5% and to provide a cold water extractable fired black tea leaf.

10. A process for preparing black tea leaf from freshly harvested green tea leaf which comprises the steps of comminuting freshly harvested green tea leaf, adding the comminuted tea leaf to water to form a tea leaf slurry, maintaining the tea leaf slurry at a temperature from 25° C to 50° C for a time sufficient to provide a substantial amount of extracted tea solids, separating the tea leaf slurry into extract and tea leaf residue, treating the extract with tannase immobilized on a solid support, adding the extracted tea leaf residue back to the tannase-treated extract to form a second tea leaf slurry, fermenting the second tea leaf slurry, and drying the fermented second tea leaf slurry with a firing step at the terminus of the drying process, to reduce the moisture content of the tea leaf to below about 5% and to provide a cold water extractable fired back tea leaf.

11. A process for preparing an instant tea which comprises the steps of comminuting freshly harvested green tea leaf, treating the comminuted green tea leaf with tannase at a temperature and for a time sufficient to impart a substantial cold water extractability to the tea leaf, fermenting the treated green tea leaf, firing the fermented tea leaf to reduce the moisture content of the tea leaf to below about 5%, preparing a hot water extract of the tea leaf, polishing the tea extract, and drying the extract to provide a powdered instant tea.

12. A process for preparing an instant tea which comprises the steps of comminuting freshly harvested green tea leaf, adding tannase to the comminuted green tea leaf at a level of from about 2 to about 20 units per gram of the greem tea leaf, maintaining the tea leaf in contact with the tannase at a temperature within the range of about 25° C to about 45° C under essentially anaerobic conditions for a sufficient time to provide a substantial increase in extractable solids, fermenting the tannase contacted tea leaf under aerobic conditions, firing the fermented tea leaf to reduce the moisture content of the tea leaf to below about 5%, preparing a hot water extract of the fired tea leaf, polishing the tea extract and drying the extract to provide a powdered instant tea.

13. In a process for preparing black tea leaf from comminuted fresh green tea leaf, the improvement comprising the steps of contacting the comminuted green tea leaf with tannase at a temperature and for a time sufficient to provide a substantial increase in cold water extractable solids, fermenting the tannase contacted tea leaf and firing the fermented tea leaf to reduce the moisture content of the tea leaf of below about 5% and produce a cold water extractable fired back tea leaf.

14. A cold water extractable fired black tea leaf prepared by comminuting freshly harvested green tea leaf, treating the comminuted fresh green tea leaf with tannase at a temperature and for a time sufficient to impart a substantial cold water extractability to the manufactured tea leaf, fermenting the treated green tea leaf and firing the fermented tea leaf to reduce the moisture content of the tea leaf to below about 5% and produce a cold water extractable fired black tea leaf.

15. A cold water extractable fired green tea leaf prepared by heating freshly harvested green tea leaf at a temperature and for a time sufficient to inactivate tea leaf enzymes before fermentation has taken place, comminuting the green tea leaf, treating the comminuted tea leaf with tannase at a temperature and for a time sufficient to impart a substantial cold water extractability to the manufactured tea leaf, and firing the treated tea leaf to reduce the moisture content of the tea leaf to below about 5% and to produce a cold water extractable fired green tea leaf.

16. A process for preparing oolong tea leaf from green tea leaf which comprises the steps of comminuting freshly harvested green tea leaf, treating the comminuted fresh green tea leaf with tannase at a temperature and for a time sufficient to impart substantial cold water extractability to the manufactured tea leaf, fermenting the treated green tea leaf for a time sufficient to impart oolong character, and firing the fermented tea leaf to reduce the moisture content of the tea leaf to below about 5% and produce a cold water extractable fired oolong tea leaf.

* * * * *

UNITED STATES PATENT AND TRADEMARK OFFICE
CERTIFICATE OF CORRECTION

PATENT NO. : 4,051,264

DATED : September 27, 1977

INVENTOR(S) : Gary Warner Sanderson et al.

It is certified that error appears in the above-identified patent and that said Letters Patent are hereby corrected as shown below:

Column 1, line 65, after "Pat. No." delete "b";
Column 2, line 8, "anerobic" should read --anaerobic--;
line 43, after "cream" (first occurence) insert a comma;
line 49, "an" should read --and--;
line 55, "enyzmes" should read --enzymes--;
Column 3, line 25, "THe" should read --The--;
line 51, "anerobic" should read --anaerobic--;
Column 4, line 31, after "is" insert --as--;
line 38, "ATTC" should read --ATCC--;
line 43, "Tha" should read --The--;
Column 5, line 7, "discussion" should read --discussions-;
line 52, "contrasts" should read --contrast--;
Column 6, line 2, "Yamade" should read --Yamada--;
line 26, "0.2M" should read --0.02M--;
line 31, "chemical" should read --Chemical--;
Column 7, line 15, after "mixed" first occurence, insert a period;
line 48, "as" should read --a--;
line 58, "anerobic" should read --anaerobic--;
Column 8, line 11, "was" should read --were--;
line 42, "prearing" should read --preparing--;
line 45, "umits" should read --units--;
Column 9, line 22, "2 g f" should read --2 g of--;
line 34, "EXTRACION" should read --EXTRACTION--;
Column 10, line 39, "as" should read --was--;
Column 11, lines 31 and 32, "formentation" should read --fermentation--;
Column 13, line 25, "withh" should read --with--;
Column 14, line 51, "commimuting" should read --comminuting--;

UNITED STATES PATENT AND TRADEMARK OFFICE
CERTIFICATE OF CORRECTION

PATENT NO. : 4,051,264
DATED : September 27, 1977
INVENTOR(S) : Gary Warner Sanderson et al.

It is certified that error appears in the above-identified patent and that said Letters Patent are hereby corrected as shown below:

Column 15, line 9, "back" should read --black--;
line 24, "greem" should read --green--;
Column 16, line 4, "of below" should read --to below--;
line 5, "back" should read --black--;

Signed and Sealed this

Fourteenth Day of March 1978

[SEAL]

Attest:

RUTH C. MASON
Attesting Officer

LUTRELLE F. PARKER
Acting Commissioner of Patents and Trademarks